United States Patent Office 3,746,683
Patented July 17, 1973

3,746,683
THROMBORESISTANT ARTICLES MADE FROM POLYURETHANES CONTAINING A POLYPROPYLENE GLYCOL-ETHYLENE OXIDE BLOCK COPOLYMER
Ival O. Salyer, Dayton, and Albert J. Blardinelli, Kettering, Ohio, assignors to the United States of America as represented by the Secretary, Department of Health, Education, and Welfare
No Drawing. Filed Dec. 24, 1970, Ser. No. 101,425
Int. Cl. C08g 51/34
U.S. Cl. 260—33.2 R    4 Claims

ABSTRACT OF THE DISCLOSURE

Articles (includes containers, conduits, devices or materials) for handling (includes containing, transporting or contacting) blood and reducing clotting comprising a mixture of a polyurethane; with at least a sufficient amount to give improved thromboresistance in the range of about 0.5 to 20% by weight based on said polyurethane of a thromboresistant polymer additive which is a polyethylene glycol, a polypropylene glycol or a block copolymer of the structure

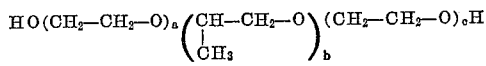

wherein $a$, $b$ and $c$ are each at least 1 and represent the number of moles of these groups, and the molecular weight of the polymer additive is in the range of about 500 to 15,000. The articles described in the previous sentence have improved nonthrombogenic (thromboresistant) properties as compared to those made from conventional polyurethanes.

BACKGROUND OF THE INVENTION

The invention described herein was made in the course of, or under, a contract with the Department of Health, Education, and Welfare.

The invention relates to articles useful in handling blood and reducing clotting as compared to articles made from conventional polyurethanes.

It is known in the prior art that the addition of Pluronic F-68 to the blood of both dogs and humans extends the safe time on a heart-lung machine; i.e. the amount of time the dog or human can be kept on the machine, and a dog's blood is much more susceptible to damage on the machine than human's (Heart Research Newsletter, Vol. XIII, No. 2, Spring 1968).

Our copending application Ser. No. 39,858, now U.S. 3,655,815 filed May 20, 1970, describes thromboresistant articles made from epoxy resins using the same thromboresistant additives as are used in this application.

A method has now been found to use Pluronic F-68 and like materials to make articles having improved thromboresistant properties as compared to conventional polyurethanes, i.e. articles such as artificial blood vessels, artificial organs such as artificial hearts, cannulas, connecting tubing and some surface areas exposed to blood in machines such as heart-lung machines, artificial kidneys and the like.

SUMMARY OF THE INVENTION

Articles (including containers, conduits, devices or materials) for handling (includes containing, transporting or contacting) blood and reducing clotting comprising a mixture of polyurethane; with at least a sufficient amount to give improved thromboresistance in the range of about 0.5 to 20%, preferably 1 to 10%, by weight based on said polyurethane of thromboresistant polymer additive which is a polyethylene glycol, a polypropylene glycol or a block copolymer of the structure

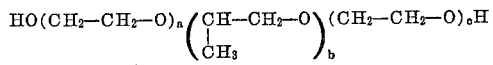

wherein $a$, $b$ and $c$ are each at least 1 and represent the number of moles of these groups, preferably the number of $a+c$ groups on a weight basis constitute about 20 to 80% of the block copolymer with the balance being the $b$ groups, and the molecular weight of the polymer additive is in the range of about 500 to 15,000. Thromboresistant polymer additives should be present in the polyurethane articles in free or unreacted state to be most effective in imparting thromboresistance to the article; i.e. the aditive is present like a plasticizer in the polyurethane. The articles described in this paragraph have improved thromboresistant properties as compared to those made from conventional polyurethane.

Polyethylene glycols useful in making the containers or conduits of the invention are obtainable commercially, e.g. one source are Carbowax polymers marketed by Union Carbide Corporation. The Carbowax polymers are described in detail in 1960 in trade literature published by this company and are of the general formula $HO(C_2H_4O)_nH$, $n$ representing the average number of oxyethylene groups. The Carbowax polymers available commercially vary from about 200 to 6000 molecular weight; however, this type of polymer can be made by methods well known in the art outside this range.

Polypropylene glycols are also available commercially from Union Carbide Corporation and are described in 1967 trade literature entitled "Physical Properties," page 10. These polymers are of the formula

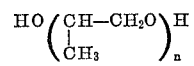

wherein $n$ averages 2 to 34 and have molecular weight from about 400 to 2100. Molecular weights outside those commercially available can be made by methods well known in the art.

The block copolymers are available commercially from the Wyandotte Chemicals Corporation and are described in trade literature of this company entitled "The Pluronic Grid," 6th edition. These materials are called Pluronic by this company and they are prepared by adding propylene oxide to the two hydroxyl groups of propylene glycol to give a polypropylene glycol then adding ethylene oxide to both ends of the polypropylene glycol to give the desired copolymers of the formula

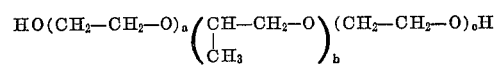

wherein $a$, $b$ and $c$ are defined hereinabove.

Polyurethanes are well known commercially and there are a number of different types. Broadly, polyurethanes can be classed as either thermoset or thermoplastic. Polyurethanes are made in the form of foams, rigid or elastomers, for use as rubbers, adhesives, coatings and as fibers for textile use. In all of these different types thromboresistance may be desirable for use where blood will be contacted, and thromboresistance can be provided in accordance with this invention for all types of polyurethanes. Polyurethanes are described in detail in the book "Polyurethanes," by Dombrow, Reinhold Plastics Application Series (1957) and also in the book by Saunders and Frisch which is referred to later in this application. Especially in the "Introduction" of the Dombrow book, a good general description of polyurethanes is given. In the thermoset type polyurethane may be either milled-in or dissolved-in depending on the particular polyurethane used, and injection molding can be used to make thromboresistant articles from this type of polyurethane.

Pigment and extenders, fillers, plasticizers or any other material normally added to polyurethanes can also be added, if desired.

The articles, containers or conduits can be formed by any of the well-known methods for forming plastics and such as moulding, machining, extruding, coating, blowing, casting, etc. One method used is to coat a solid water soluble material of the external shape that is desired with nonthromogenic polyurethane of the invention and cure it, then dissolve out the water soluble material to give the article of desired shape.

DESCRIPTION OF THE PREFERRED EMBODIMENTS

The invention is further illustrated by, but not limited to, the following examples.

Example 1

The procedure for addition of Pluronics to urethanes without solvent is described below.

In handling polyurethanes in the form of elastomers, one of the most important requirements is that all water and moisture be kept away from the system until it is crosslinked. Routinely then, all the Adiprene L-100 used was vacuum degassed to remove volatile products. The degassing technique required that the vacuum be applied slowly since foaming can otherwise occur.

The specific degassing procedure consisted of applying a vacuum of from 3 to 4 mm. Hg over a period of about 15 minutes using intermittent heating, followed by 15 minutes at that pressure. The vacuum was then released and the air space replaced with dry nitrogen. This dry atmosphere was maintained over the Adiprene until a significant degree of gel occurred in the curing step.

To prepare the elastomer 12.5% by weight MOCA (4,4'-methylenebis(o-chloroaniline)) was added to the Adiprene (polyurethane prepolymer) and blended for 4 minutes. MOCA has a melting point of 100-109° C. and therefore was melted prior to its addition to the Adiprene. Following the addition of the MOCA curing agent to the Adiprene, melted (60° C.) Pluronic F-68 was added to the system and stirred for an additional two minutes.

Addition of the Pluronic F-68 material to the Adiprene L-100 system involves a most critical but necessary step. This is because the Pluronic F-68 is a polyol and by itself can crosslink the Adiprene L-100. Thus it is preferred that the MOCA curing agent be added to the Adiprene L-100 prior to the addition of Pluronic F-68.

After blending the Adiprene/MOCA/Pluronic components they were cast directly into the desired molds. One of the limitations of this urethane system is that the pot life is only 20 minutes and therefore castings have to be made immediately. The castings were then cured for 115 hours at 50° C. or 4 hours at 100° C. This procedure was used to prepared Pluronic F-68 modified polyurethane for casting diaphragms for the Statham-DeBakey blood pump.

Example 2

The preparation of a typical polyurethane solution used for coating the inside of the glass mandrels was developed. Adiprene L-100 (100 g.) was dissolved into 150 ml. of tetrahydrofuran (THF). At the same time, 12.5 g. of 4,4'-methylenebis(o-chloroaniline) MOCA was dissolved in another 45 ml. of THF. The MOCA solution was added to the Adiprene L-100 (polyurethane prepolymer) solution and mixed. Then 3.4 g. of Pluronic F-68 flakes were added to the THF solution of Adiprene and MOCA and stirred until dissolved. This amount of Pluronic F-68 was equal to 3% by weight of the combined Adiprene and MOCA.

This quantity of material was enough for slush coating the inside of three glass mandrels with about 6 to 10 layers. This solution was protected from moisture in the air with a nitrogen atmosphere.

Polyurethane solutions for dip-coating the outside of Rigidax or glass mandrels were prepared in the same manner, but much larger volumes (~2500 ml.) were needed.

After the desired number of coatings (dip or slush) were applied, the solvent was allowed to evaporate overnight at ambient conditions. The bladders were finally cured the next day for 4 hours at 100° C. A final cure of 4 hours at 100° C. appeared to improve the mechanical strength of the polyurethane bladders more than and extended cure (115 hours) at 50° C.

For the purpose of preparing the left ventricular assist bladders both Rigidax and glass mandrels were used. The Rigidax mandrels were prepared by the Holter Company, Bridgeport, Pa. and the glass mandrels by Shell Development Corporation. The Rigidax mandrels could be used only once since they must be dissolved away after the bladder is formed. However, the glass mandrel was reusable as long as it could hold up to the abuse of rolling a bladder over its surface.

The Rigidax mandrels supplied to us by the Holter Company had a thin coating of polyvinyl alcohol to provide a better surface finish. Each of the mandrels we received, however, has a fairly rough surface especially in the more critical, large-diameter center section. While these mandrels were usable, the surface finish of the bladders could be no better than that of the starting mandrel.

The glass mandrel from Shell Development had an excellent, smooth surface but was designed for low modulus silicones which could be rolled off the mandrel.

The polyurethane prepolymer used in the example was Adiprene L-100 marketed by the Du Pont Company. It is made from poly(1,4-oxybutylene) glycol and tolylene diisocyanate, and it has the formula

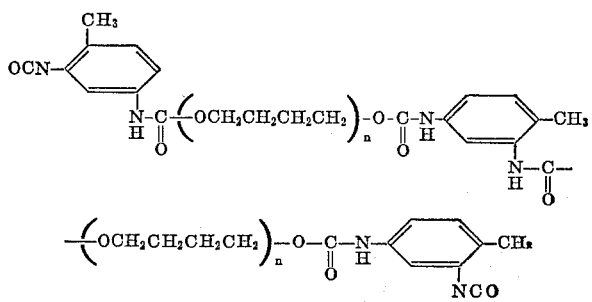

wherein $n$ is an integer. These and similar materials are described in the book "High Polymers, vol. XVI," Polyurethanes: Chemistry and Technology, II Technology, Part II by Saunders and Frisch (Interscience) 1964, p. 341 et seq. These types of polyurethanes are called elastomeric having rubber-like properties and more particularly they are polyether-based elastomers. The prepolymer possesses terminal —NCO groups and so can be cured by active hydrogen containing materials. The particular curing agent used in this example is also marketed by Du Pont for this use and is called MOCA, 4,4'-methylenebis (o-chloroaniline).

Pluronic F-68 (a nonionic detergent from the Wyandotte Chemical Company) is a copolymer of propylene oxide and ethylene oxide in 20:80 weight ratio, respectively, having a molecular weight of about 8500 and the following structure:

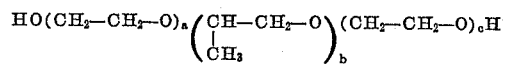

Pluronics generally including the specific one named above are described in a Wyandotte sales brochure entitled "The Pluronic Grid," 6th edition.

The articles prepared are broadly described as circulatory assist devices, i.e. the diaphragms for the Statham-DeBakey blood pump and the left ventricular assist device bladders. Other such articles which can be prepared include intra-aortic assist balloons.

Example 3

The molded cured polymer of Example 1 was subjected to in vivo testing in dogs to determine its thromboresistance as follows: The in vivo test used was the inferior vena cava ring implant test. The rings were 10 mm. long with an 8 mm. OD and 7 mm. ID. Normally for this test the rings are prepared with beveled on streamlined internal leading and trailing edges, but it was found difficult to do this with these materials and they were not beveled. The rings were implanted in the inferior vena cava of the dog through a right thoracotomy during Nembutal anesthesia. The rings were placed through a right atriotomy into the cava and then secured in place with a ligature. Good apposition of the venous wall against the ring was achieved with a fabric wrap on the outside of the vena cava. All materials were initially subjected to a two-hour ring implant test and if the materials appeared to have no more than minimal thrombus at the end of this time, then additional rings were implanted in other animals for two weeks and this was considered the chronic test. No animal was used more than once for a caval implant.

In the 2-hour (acute test) of the cured polymer of Example 1, improvement in thromboresistance was shown as compared to the same type of polyurethane not containing the Pluronic, i.e. the controls; however, the improvement was not as great as was expected probably because the rings were not beveled. Past experience has indicated the bevel is needed in this test to reduce turbulence in the blood which in itself has been shown to cause clotting.

Although the invention has been described in terms of specified embodiments which are set forth in detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What we claim is:

1. An article for handling blood and reducing clotting made from a mixture of a polyurethane; with at least a sufficient amount to give improved thromboresistance in the range of about 0.5 to 20% by weight based on said resin of a thromboresistant polymer additive which is a block copolymer of the structure.

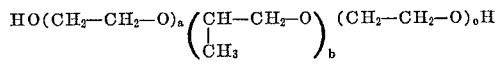

wherein $a$, $b$ and $c$ are each at least 1 and represent the number of moles of these groups, and the molecular weight of the polymer additive is in the range of about 500 to 15,000 and the polymer additive is present in an uncombined state.

2. An article of claim 2 wherein the polymer additive is the block copolymer and the ratio of $a+c$ groups to $b$ groups is in the range of about 20:80 to 80:20 by weight, respectively.

3. An article of claim 2 wherein the ratio of $a+c$ groups to $b$ groups is about 80:20 by weight, respectively, the average molecular weight of the copolymer is about 8500.

4. An article of claim 1 wherein said polyurethane is an elastomeric type.

References Cited

UNITED STATES PATENTS

| | | | |
|---|---|---|---|
| 3,505,377 | 4/1970 | Morehouse | 260—33.2 |
| 3,590,125 | 6/1971 | Hymes | 424—78 |

FOREIGN PATENTS

| | | | |
|---|---|---|---|
| 971,171 | 9/1964 | Great Britain | 260—2.5 |

MAURICE J. WELSH, JR., Primary Examiner

E. C. RZUCIDLO, Assistant Examiner

U.S. Cl. X.R

128—214; 260—2.5 AG, 2.5 AK, 77.5 A, 858; 424—78